No. 874,986. PATENTED DEC. 31, 1907.
C. A. PARSONS.
VACUUM PRODUCING APPARATUS.
APPLICATION FILED JUNE 17, 1905.
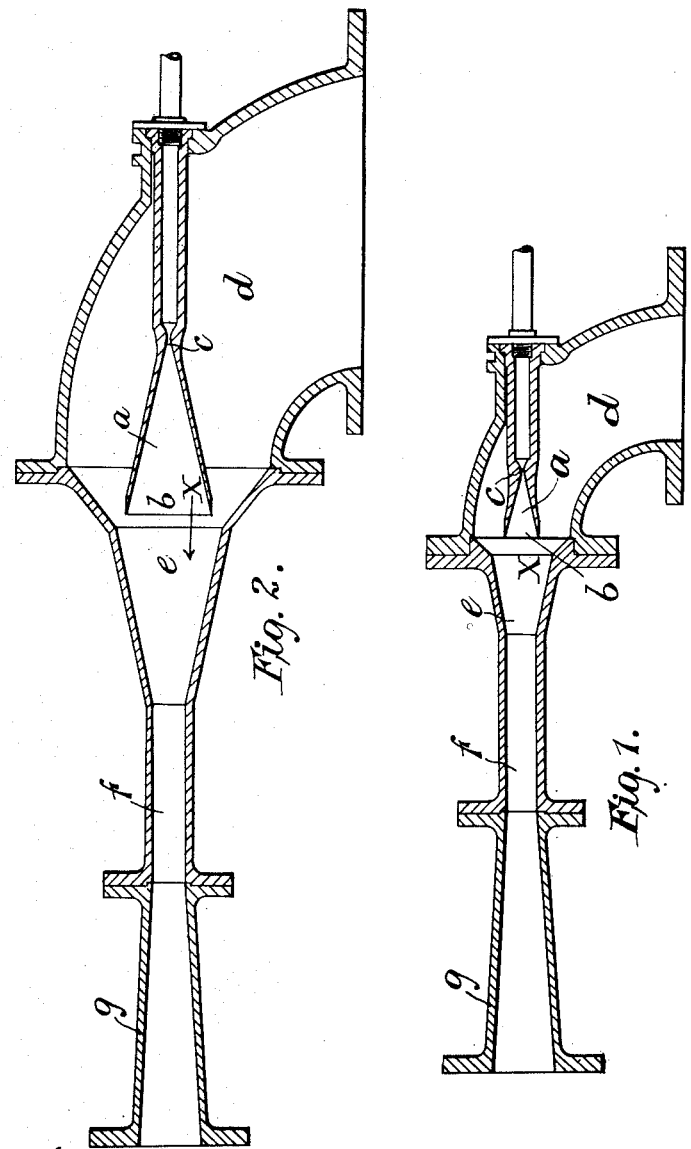

No. 874,986. PATENTED DEC. 31, 1907.
C. A. PARSONS.
VACUUM PRODUCING APPARATUS.
APPLICATION FILED JUNE 17, 1905.
3 SHEETS—SHEET 2.
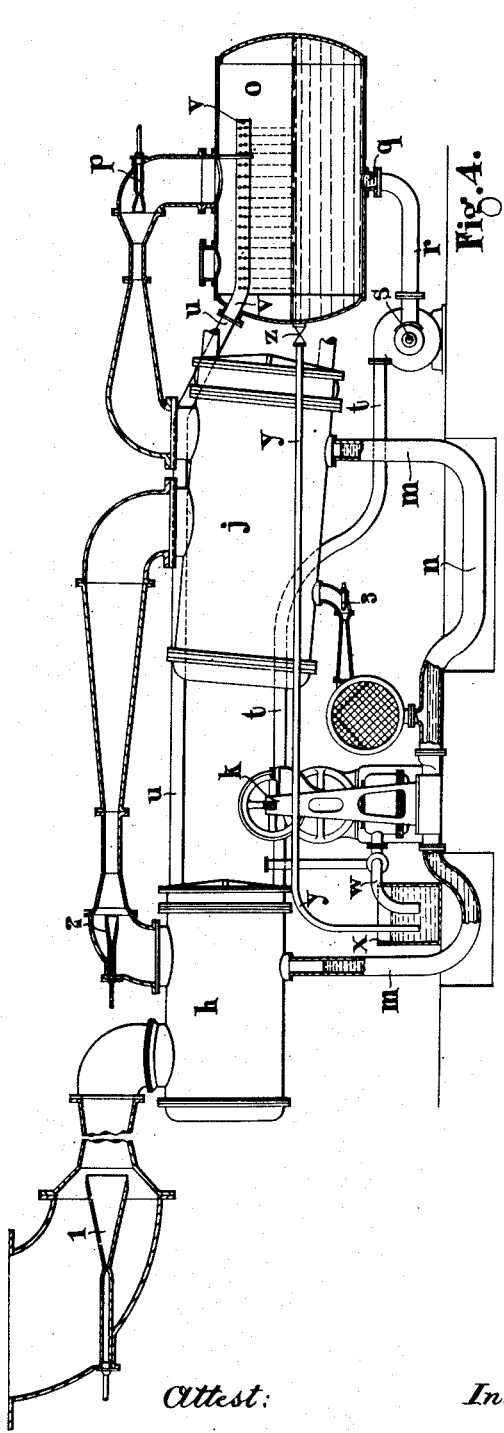
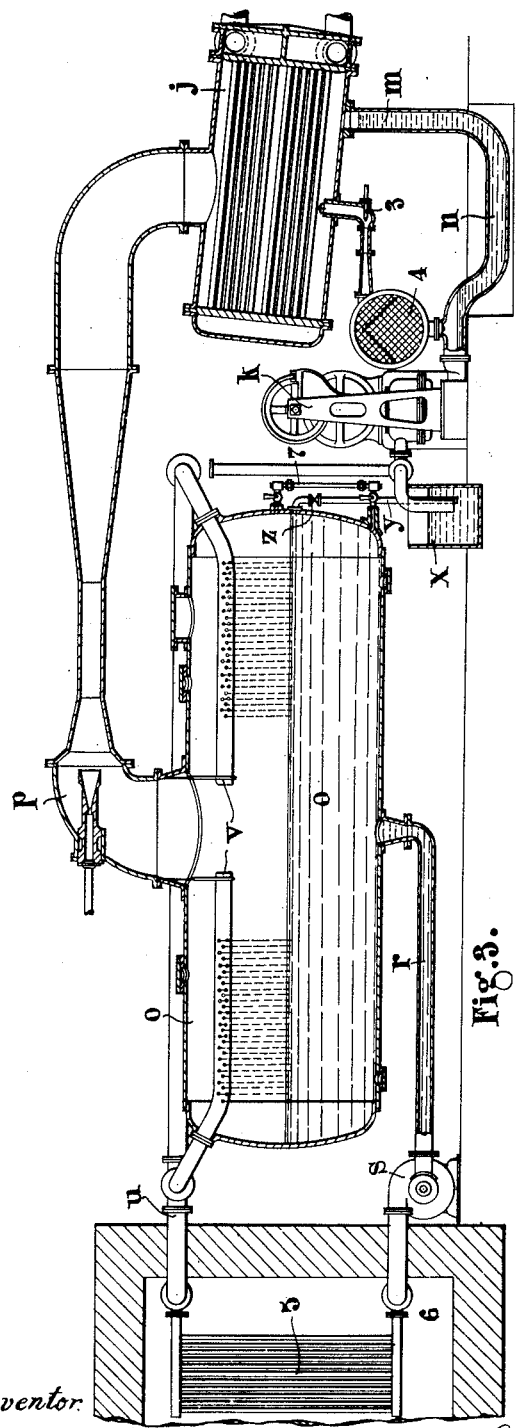

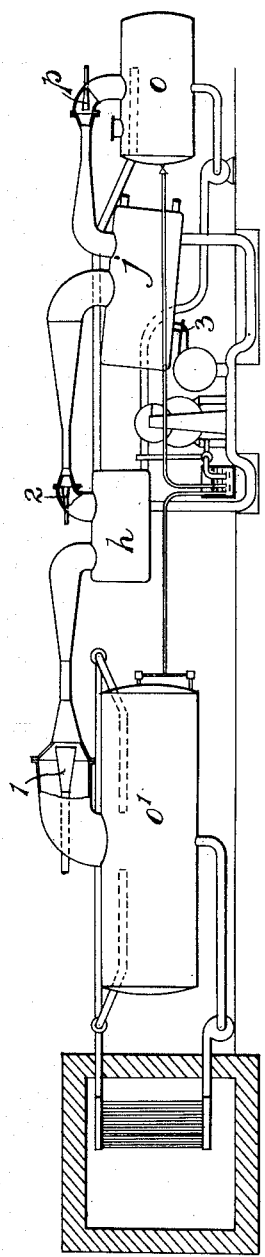

UNITED STATES PATENT OFFICE.

CHARLES ALGERNON PARSONS, OF NEWCASTLE-UPON-TYNE, ENGLAND.

VACUUM-PRODUCING APPARATUS.

No. 874,986.  Specification of Letters Patent.  Patented Dec. 31, 1907.

Application filed June 17, 1905. Serial No. 265,740.

*To all whom it may concern:*

Be it known that I, CHARLES ALGERNON PARSONS, of Heaton Works, Newcastle-upon-Tyne, in the county of Northumberland, England, have invented certain new and useful Improvements in Vacuum-Producing Apparatus, of which the following is a specification.

The invention relates to the production of high vacua such as is necessary in condensers, refrigerating apparatus or evaporators.

In my Patent No. 741270 of the year 1903 is described and claimed the use of my vacuum intensifier with and without an intermediate cooler or condenser. In addition to the advantage claimed in this patent, I have since found that the effect of the vacuum intensifier on the condenser is to draw off the residual air to a much greater extent than is possible with ordinary pumps alone, and the condensation takes place with much greater rapidity and allows a great reduction in the cooling surface, provided the circulating water is not diminished in volume and the velocity of flow is about five feet per second through the tubes, and the total quantity of circulating water is equal to about fifty times the feed.

The object of the invention is to produce a more highly attenuated medium than has hitherto been commercially possible.

The invention consists in a specific arrangement of vacuum intensifiers whereby the maximum available attenuation is obtained in a chamber and this arrangement comprises vacuum intensifiers of the type described in my above mentioned patent arranged in series with intermediate coolers and stepped in size so as to deal in stages with the fluid evacuated from the chamber.

The invention also consists in employing vacuum intensifiers arranged as above to effect cooling by evaporation for the purpose of obtaining efficient refrigeration or cooling for cold storage or other purposes from steam power.

The invention further consists in utilizing a medium cooled in this way as the circulating or cooling agent in a condenser or cooler in order to obtain increased vacua.

The invention also consists in the arrangements of vacuum producing plant hereinafter described.

Referring to the accompanying drawings, Figure 1 is a section through a typical form of my vacuum intensifier for obtaining moderately high degrees of attenuation of vapor density. Fig. 2 is a modified form of the intensifier for dealing with very high degrees of attenuation of vapor density. Fig. 3 is a part sectional elevation illustrating an arrangement of vacuum intensifiers in series for producing a moderately high degree of attenuation of vapor density, the intensifiers being shown in connection with an evaporative chamber. Fig. 4 is a part sectional elevation showing an arrangement of vacuum intensifiers in series and having an intensifier for cooling the circulating medium of one of the coolers in order to produce very high degrees of attenuation of vapor density. Fig. 5 is a diagrammatic elevation showing an arrangement of intensifiers, according to my invention similar to Fig. 4 but in connection with an evaporative chamber.

According to this invention I combine two or more vacuum intensifiers in series, with intermediate coolers between each intensifier and the next as a means for obtaining higher vacua. I have found that with suitably shaped jets and neck pieces, when discharging into the usual vacua of condensers, it is possible in practice to obtain from two, to three, one hundred, or more fold, of reduction of vapor of exhaustion at one operation. Further, I have found that if I arrange a vacuum intensifier to discharge into a condenser fitted with an air pump, assisted by an intensifier, as described in my previous patent, referred to above, the condenser containing a vapor density of 1" mercury, I obtain a vapor density in the suction of the added intensifier or augmenter of from one-tenth to one fiftieth of an inch of mercury or even less.

Though I have mentioned above that with two intensifiers and two coolers a vapor density of under one-tenth of an inch of mercury or less was obtained, yet, in some of the experiments with the suction of the intensifier blanked off, the mercury column showed equal or even slightly greater height than the standard barometer, indicating a very high degree of attenuation of vapor density. If I add a third intensifier, and another condenser or cooler in series so as to discharge into the suction of the second intensifier, I obtain a still smaller vapor density and so on, the pressure of the steam in the jets being about 120 lbs. per square inch. I have made actual experiments with three intensifiers as described and have obtained a vapor density which I have measured by means of a eudometer and found equal to 0.4 millimeters of mercury. In the case of the higher vacuum intensifiers the diameter of the mouth of the jet is much increased so as to allow of the extra expansion, this diameter being in some cases from twenty to fifty or even more times that of the narrowest part of the jet. It should be generally understood that the surface of the coolers must be sufficient to condense the steam from the jets with ease, and to cool the vapor after compression by the jet. In some cases the steam from one or more of the intensifier jets may be condensed by spraying clean cold water into the pipe; the water spray then replaces an auxiliary surface condenser.

The size of the steam jets and the necks into which they discharge must be proportioned to the amount of vapor with regard to its velocity and vapor density. Generally the intensifiers will be increased in size and in the amount of flare, and the coolers will be increased in surface towards the side of the apparatus of less vapor density, and the last cooler and intensifier will in general be many times larger than the others.

The form of nozzle which I have found most convenient for obtaining moderate degrees of vacuum is shown in Fig. 1. It will be seen that the nozzle $a$ is of conical form, the cross sectional area at the base $b$ being many times, say about 10 or even more times, the cross sectional area of the narrowest part $c$. This diverging nozzle opens into a pipe $d$ in the walls of which the nozzle is supported and through which it is required to draw vapor, air or other fluid from the chamber to be evacuated. The pipe $d$ is connected to another pipe having a short double converging part $e$, arranged near the exit from the steam nozzle. This double converging part leads to a parallel length of pipe $f$ forming a throat way which again slowly diverges in the expanding part $g$. By means of these converging and diverging nozzles and pipes fluid passing in the direction of the arrow X may be under less pressure in the pipe $d$ than in the pipe $g$, as is well understood. The first converging part of the cone $e$ is shown in the drawing shorter and more rapid than the second part in order to provide an easy passage for the fluid without serious shock and to avoid an excessive length of cone. This I have found to be the form which in practice produces the best results. It may however be made with a continuous taper similar to the first part or may form with it a continuous curve.

In Fig. 2 which is a suitable form of intensifier for high degrees of vacuum, the proportions of the various parts are slightly different from the form shown in Fig. 1, to deal with large volumes of vapor and consequently is the form which I prefer to use first in the series, i. e. next to the vessel or chamber in which the highest vacuum is to exist. In this case the area at the base $b$ may be as much as 250 or even more times that of the narrowest part $c$.

By employing my vacuum intensifiers to effect cooling by evaporation for the purpose of obtaining efficient refrigeration for cold storage and other purposes from steam power, I am able to produce, with a very small amount of auxiliary machinery, a very large amount of cold, or to deal with large amounts of vapor in chemical or evaporative processes. In effecting this in a climate such as that of England to obtain a sufficient degree of cold for say cold storage purposes, I employ a good air pump capable of exhausting to $2''$ of mercury absolute, assisted by my vacuum intensifier and a cooler, and maintain a vacuum in the main condenser of from $\frac{1}{2}''$ to $1''$ of mercury absolute pressure. Into the main condenser I arrange to discharge another vacuum intensifier, the latter being preferably of much larger size and of suitable proportions of jet to discharge neck for dealing efficiently with the much higher vacuum and larger volume. The latter intensifier draws the vapor from the evaporative chamber containing the fluid to be cooled; such as water, brine, etc. which when cooled, is circulated through pipes, or applied in any well known manner. It is well known of course that water, or mixture of water with common salt, sulfate of soda, and other well known salts, is rapidly cooled by evaporation and ebullition when subjected to high vacua, a large surface being exposed by placing it in shallow pans, or by spraying, agitation or by other means. A suitable arrangement of plant for obtaining such degrees of cold is shown in Fig. 3, where an intensifier $p$ is arranged to draw from an evaporator $o$ which is about half filled with brine. This intensifier $p$ is connected by a pipe with a surface condenser $j$, which is provided with an intensifier, 3, and auxiliary cooler, 4, connected to an air pump $k$ as in my beforementioned patent. The air pump, $k$, pumps the condensed vapor and non-condensable gases out of the condenser $j$ through the pipe $m$, which is provided with a dip seal $n$, into the hot well $x$.

The evaporator chamber communicates by means of a pipe $r$ with a circulating pump $s$ which passes the cooled brine through the refrigerating coils 5 in a freezing or cold storage chamber 6 and back through the pipes $u$ to spray pipes $v$, $v$, placed in the upper part of the evaporating vessel $o$.

A gage glass 7 is provided for indicating the level of the brine in the chamber $o$ and a pipe $y$ and valve $z$ are provided for the purpose of leading water from the hot well to the brine chamber in order to compensate for evaporation. The valve z may be operated by hand or automatically.

The action of this apparatus is as follows: The condenser with its air pump k and intensifier 3, exhausts the evaporating chamber o and is of itself capable of producing a vacuum of within say about 1.5 inches of barometric height. The intensifier p produces a still higher degree of exhaustion to an absolute pressure equal to about 1/10th inch of mercury or less thus causing the brine to evaporate rapidly. The vapor thus produced is drawn off by the intensifier p and discharged into the condenser j where it is cooled and condensed along with the steam from the intensifier jet.

The heat necessary for the evaporation of the brine is taken from the brine itself which in consequence is rendered intensely cold. This cold brine is drawn off continually by the circulating pump s and passed through the refrigerator coils 5 where it absorbs heat from the chamber 6 or from the articles placed in the chamber for the purposes of refrigeration. The heated brine then returns to the evaporative chamber through the spray tubes v and so the cycle of operation goes on.

If a higher vacuum or greater degrees of cold than are possible with the foregoing arrangement, or substantially similar degrees of vacua or cold in very hot climates where the circulating water is at a high initial temperature, be required, I employ the cooled medium to increase the effect of an intensifier cooler or condenser. In this case I add a third vacuum intensifier, discharging into a third cooler or condenser, and, to make this cooler more effective, I circulate through it water or brine cooled during its path by being subjected to the vacuum of the suction side of the second intensifier, either in a separate chamber or during its passage through the circulating part of the condenser itself, but I sometimes prefer to place a fourth vacuum intensifier in parallel with the second intensifier above referred to, the sole function of which is to exhaust from, and thereby cool, the brine for circulation in this third cooler. By this means a greater range of temperature can be covered.

Fig. 4 shows an arrangement for obtaining such increased vacua or degrees of cold, where the first intensifier 1 draws the vapor or other fluid direct from the chamber to be evacuated and exhausts into a cooler or condenser h, the circulating fluid of which is artificially cooled in any suitable manner. From this cooler the vapor or other fluid is drawn by means of a second intensifier 2. This second intensifier discharges into the main condenser j which is provided with a vacuum intensifier 3 working in conjunction with a pump, k, in the manner described in my beforementioned patent. The pipe m which connects the condenser j to the pump k is provided with a dip seal n, which prevents the vapor exhausted from the condenser j from finding its way back. The intermediate condenser h, is also connected to the air pump k through the pipe m'.

It will be seen that the first intensifier 1 draws the vapor or other fluid from the chamber to be evacuated. This vapor together with the steam from the jet in the evacuator 1 passes to the intermediate condenser h where some of the steam is condensed and drawn off into the air pump through the pipe n while the air and vapor are drawn off through the second intensifier 2, from which they pass to the condenser j there to be dealt with in the manner described in my beforementioned patent.

In addition to the arrangement described, I may use a brine evaporator o operating in conjunction with the above so as to produce a cold fluid for circulating through the condenser tubes. This arrangement of my apparatus may also be described with reference to Fig. 4. The evaporator o is provided with an evacuator or intensifier p which may conveniently work in parallel with the intensifier 2, in series with the intensifier 3, and feed into the main condenser j. At the bottom of the brine evaporator o there is provided an opening q from which a pipe r leads to a centrifugal pump s. This pump delivers to the intermediate condenser h by the pipe t and the hot brine is led away from the condenser by the pipe, u, back to the evaporator o. The pipe u leads to an internal pipe v which is placed in the upper space of the evaporator and is provided with a number of perforations through which the hot brine passes in fine streams as shown in the figures, thus presenting a large surface for evaporation.

Without interfering with the operation of the intensifiers, 1, 2 and p other steam apparatus may be arranged to discharge into the main condenser j provided that its cooling area be made large enough and the required circulation of cooling fluid be maintained. For instance in refrigerating plant on board ship the condenser j may be the main condenser of the ship's engines.

As is well understood the high vacuum in the evaporator o causes the brine to evaporate and in doing so it abstracts heat from itself thus maintaining a good cooling medium for the condenser h.

The air pump k is provided with a discharge pipe w which leads to the hot well x. From the hot well I may provide a pipe y leading to the evaporator o and having a valve z adapted to be operated automatically by any suitable gear such as a ball float valve as indicated in Fig. 4 controlled by the water level within the evaporator or by hand as desired. Thus when the brine in the evaporator falls below a certain level, due to evaporation, the opening of the valve z causes water to flow from the hot well to the evaporator and thus compensate for any loss.

I do not restrict the number of intensifiers to three or four but may use more for special purposes.

If a still higher vacuum or degree of cold be desired I may arrange the intensifier 1 to draw, as shown in the diagram Fig. 5, from another cooler o' having within it very strong brine or fluid with a very low freezing point, suitable means being provided for making up for the brine evaporated. The excessively cold brine is used as required.

I do not restrict the use of this apparatus to water or water vapor, but I may use other liquids having higher or lower vapor densities. I may also use a number of intensifiers in combination with an equal or less number of coolers in series, for the purpose of condensing or exhausting air or gas or vapor.

My invention may be applied to industrial processes in which high vacua are required, e. g. in the evaporation of sugar or the fractionating of chemical substances. In the case of sugar evaporation, the intensifier draws from the pan.

What I claim as my invention and desire to secure by Letters Patent is:—

1. In combination for the production of high vacua, a chamber to be evacuated, a plurality of vacuum intensifiers arranged to draw from said chamber in series, said intensifiers being diminishingly graded in size from the chamber outward, condensers alternating with said intensifiers, substantially as described.

2. In high vacua, cooling or condensing plant, a chamber to be evacuated, a vacuum intensifier drawing directly from said chamber, a condenser into which the air and vapor from the chamber and intensifier are discharged, an air pump connected by a passage to the lower part of the condenser, a vacuum intensifier drawing from the condenser and discharging into the passage connecting the air pump with the condenser, and a dip seal in said passage, substantially as described.

3. In high vacua, cooling or condensing plant, a chamber to be evacuated and a condenser, a passage connecting said chamber and condenser, a vacuum intensifier in said passage drawing from the chamber, means for cooling the circulating fluid in said condenser, a second condenser, a passage connecting the two condensers and a second vacuum intensifier in the passage drawing from the first condenser, an air pump drawing condensed fluid through a dip seal from the second condenser and a third intensifier operating in series with said air pump, and a passage having a dip seal connecting the air pump with the first condenser, substantially as described.

4. In high vacua, cooling or condensing plant, a chamber to be evacuated and a condenser, a passage connecting said chamber and condenser, a vacuum intensifier in said passage drawing from the chamber, an evaporative cooler for cooling the circulating medium in said condenser, a second condenser, a passage connecting the two condensers and a second vacuum intensifier in the passage drawing from the first condenser, an air pump drawing condensed fluid through a dip seal from the second condenser and a third intensifier operating in series with said air pump, and a passage having a dip seal connecting the air pump with the first condenser, substantially as described.

5. In high vacua, cooling or condensing plant, a chamber to be evacuated and a condenser connected therewith by a passage, a vacuum intensifier in said passage drawing from the chamber, a second condenser connected by a passage with the first condenser, a vacuum intensifier in this passage discharging from the first into the second condenser, a circulating fluid cooling chamber, a passage connecting the cooling chamber with the second condenser and a vacuum intensifier in said passage drawing from the circulating fluid cooling chamber, an air pump and an intensifier working in series with the air pump and passages having dip seals connecting both condensers with the air pump, substantially as described.

6. In high vacua, cooling or condensing plant employing vacuum evaporative chambers and a pump, automatic means for making up from the fluid withdrawn by the vacuum device for the loss of fluid due to evaporation the fluid being fed into the evaporative chambers by atmospheric pressure, substantially as described.

In testimony whereof I have signed my name to this specification in the presence of two subscribing witnesses.

CHARLES ALGERNON PARSONS.

Witnesses:
CHARLES P. MARTIN,
BERTRAM H. MATTHEWS.